(12) United States Patent
Blackwell et al.

(10) Patent No.: US 9,232,783 B2
(45) Date of Patent: Jan. 12, 2016

(54) ADJUSTABLE PLATFORM ASSEMBLY FOR ATTACHING TO TREE

(71) Applicants: James Blackwell, Salina, KS (US); Alan Suter, Oakley, KS (US)

(72) Inventors: James Blackwell, Salina, KS (US); Alan Suter, Oakley, KS (US)

( * ) Notice: Subject to any disclaimer, the term of this patent is extended or adjusted under 35 U.S.C. 154(b) by 0 days.

(21) Appl. No.: 14/451,272

(22) Filed: Aug. 4, 2014

(65) Prior Publication Data

US 2015/0034419 A1    Feb. 5, 2015

Related U.S. Application Data

(60) Provisional application No. 61/861,824, filed on Aug. 2, 2013.

(51) Int. Cl.
*A01M 31/00*   (2006.01)
*A01M 31/02*   (2006.01)

(52) U.S. Cl.
CPC ..................... *A01M 31/02* (2013.01)

(58) Field of Classification Search
CPC ..................................................... A01M 31/02
See application file for complete search history.

(56) References Cited

U.S. PATENT DOCUMENTS

| | | | |
|---|---|---|---|
| 4,148,456 A * | 4/1979 | Garchinsky | 248/219.4 |
| 4,582,168 A | 4/1986 | Frey | |
| 4,600,081 A | 7/1986 | Wade | |
| 4,721,183 A | 1/1988 | Koniecka | |
| 5,275,368 A * | 1/1994 | Hall et al. | 248/218.4 |
| 5,435,412 A * | 7/1995 | Franklin et al. | 182/188 |
| 5,937,969 A | 8/1999 | Woller et al. | |
| 6,102,158 A | 8/2000 | Winschel | |
| 6,185,303 B1 * | 2/2001 | Losey | 379/454 |
| 6,196,354 B1 | 3/2001 | Anthony et al. | |
| 6,571,916 B1 * | 6/2003 | Swanson | 182/187 |
| 7,063,188 B1 | 6/2006 | Liles | |
| 7,114,736 B2 | 10/2006 | Stodola et al. | |
| 7,594,631 B1 * | 9/2009 | Carnevali | 248/219.4 |
| 8,083,192 B2 * | 12/2011 | Wells et al. | 248/218.4 |
| 8,230,972 B2 * | 7/2012 | Johnson | 182/187 |
| 8,522,920 B1 * | 9/2013 | Salyer et al. | 182/188 |
| 8,708,592 B1 * | 4/2014 | Gardner | 403/53 |
| 2006/0231707 A1 * | 10/2006 | Schrot | 248/218.4 |

* cited by examiner

*Primary Examiner* — Alvin Chin-Shue
(74) *Attorney, Agent, or Firm* — Jeffrey L. Thompson; Thompson & Thompson, P.A.

(57) ABSTRACT

An adjustable platform assembly attaches to a tree to provide a hunting dog perch or a seat for a hunter. The assembly includes a tree hugging subassembly having first and second padded tree engaging members connected together by a hinge, and strap fasteners connected to outer side edges of the tree engaging members for securing the assembly to a tree. A first frame member is attached to the tree hugging subassembly and is pivotally adjustable about a first axis that extends generally perpendicular to the tree and perpendicular to a first plane. A second frame member is attached to the first frame member and is adjustable about a second axis that extends generally parallel with the first plane. A platform attached to the second frame member can be adjusted to a desired horizontal orientation by adjusting the first and second frame members about the first and second axes.

6 Claims, 5 Drawing Sheets

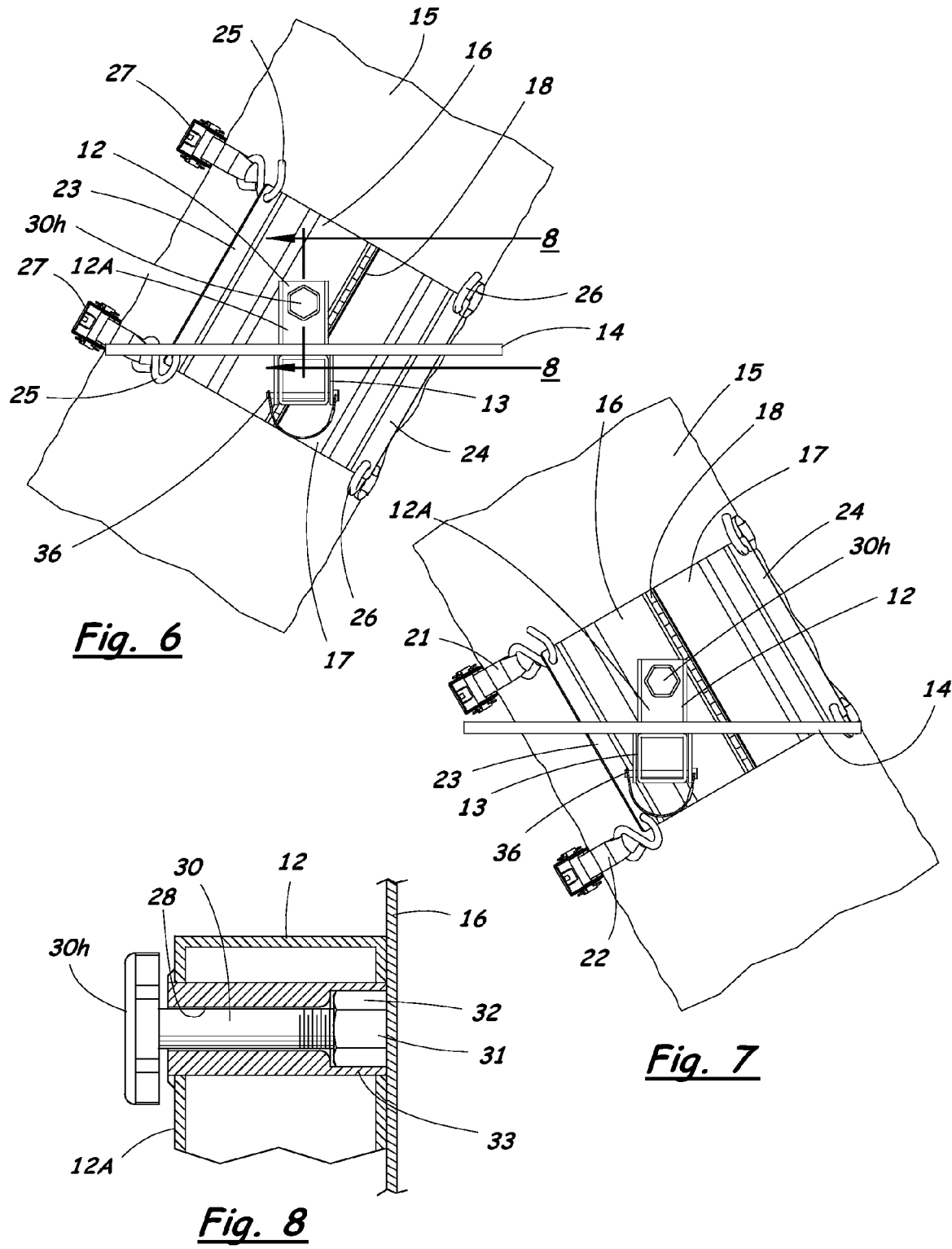

ADJUSTABLE PLATFORM ASSEMBLY FOR ATTACHING TO TREE

RELATED APPLICATIONS

This application claims priority of U.S. Provisional Application No. 61/861,824 filed on Aug. 2, 2013. The content of this prior application is incorporated herein by reference.

BACKGROUND OF THE INVENTION

1. Field of the Invention

The present invention relates generally to portable seats for attaching to trees and, in particular, to an adjustable platform that can be attached to a tree for use as a hunter's seat or an elevated perch for a hunting dog.

2. Description of the Related Art

Platform assemblies for attaching to trees are known in the prior art. For example, hunting stands are commonly used to provide a comfortable seat for a hunter while observing wildlife. Such hunting stands and tree seats are typically attached to a tree trunk or tree branch using a strap or other suitable structure that surrounds the tree.

However, most tree stands and tree seats require a straight, vertical tree to provide a level seat. If a tree is slanted away from true vertical, the attached seat will also have that same slanted orientation.

A variety of tree stands and tree seats have been developed to accommodate trees that are leaning away from true vertical. For example, U.S. Pat. Nos. 4,582,168, 6,102,158, 6,196,354, 6,571,916, and 8,230,972 disclose various tree seats and tree stands that are adjustable to accommodate slanted trees.

There is a need in the industry for an improved platform assembly for attaching to non-vertical, slanted trees.

SUMMARY OF THE INVENTION

The present invention provides an adjustable platform assembly that attaches to a tree to provide an elevated hunting dog perch or a seat for a hunter. The assembly includes a tree hugging subassembly having first and second padded tree engaging members connected together by a hinge, and first and second strap fasteners connected to respective outer side edges of the tree engaging members for securing the assembly to a tree. A first frame member is attached to the tree hugging subassembly and is pivotally adjustable about a first axis that extends generally perpendicular to the tree and perpendicular to a first plane. A second frame member is attached to the first frame member and is adjustable about a second axis that extends generally parallel with the first plane. A platform attached to the second frame member can be adjusted to a desired horizontal orientation by adjusting the first and second frame members about the first and second axes.

According to a broad aspect of the present invention, an adjustable platform assembly is provided for attaching to a tree, comprising: a tree hugging subassembly comprising a first tree engaging member and a first strap fastener for securing the first tree engaging member to a tree; a first frame member attached to the first tree engaging member, the first frame member being pivotally adjustable relative to the first tree engaging member about a first axis that extends generally perpendicular to an axis of the tree and perpendicular to a first plane; a second frame member attached to the first frame member, the second frame member being adjustable relative to the first frame member about a second axis that extends generally parallel with the first plane; and a platform attached to the second frame member, whereby the platform can be adjusted to a desired orientation by adjusting the first frame member relative to the first tree engaging member and by adjusting the second frame member relative to the first frame member.

According to another broad aspect of the present invention, an adjustable platform assembly is provided for attaching to a tree, comprising: a tree hugging subassembly comprising first and second tree engaging members connected together by a hinge, and first and second strap fasteners connected to respective outer side edges of the tree engaging members for securing the tree hugging subassembly to a tree; a first frame member attached to the tree hugging subassembly, the first frame member being pivotally adjustable relative to the tree hugging subassembly about a first axis that extends generally perpendicular to the tree and perpendicular to a first plane; a second frame member attached to the first frame member, the second frame member being adjustable relative to the first frame member about a second axis that extends generally parallel with the first plane; and a platform attached to the second frame member, whereby the platform can be adjusted to a desired orientation by adjusting the first frame member relative to the tree hugging subassembly and by adjusting the second frame member relative to the first frame member.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 6 is a front elevation view of the adjustable platform assembly in a third adjusted position to accommodate yet another leaning tree.

FIG. 7 is another front elevation view of the adjustable platform assembly in a fourth adjusted position to accommodate still another leaning tree.

FIG. 8 is a cross section detail view taken along line 8-8 in FIG. 6 to illustrate an adjustable pivot connection between a first tree engaging member and a first frame member of the adjustable platform assembly.

DETAILED DESCRIPTION OF THE PREFERRED EMBODIMENT

Figure 1:
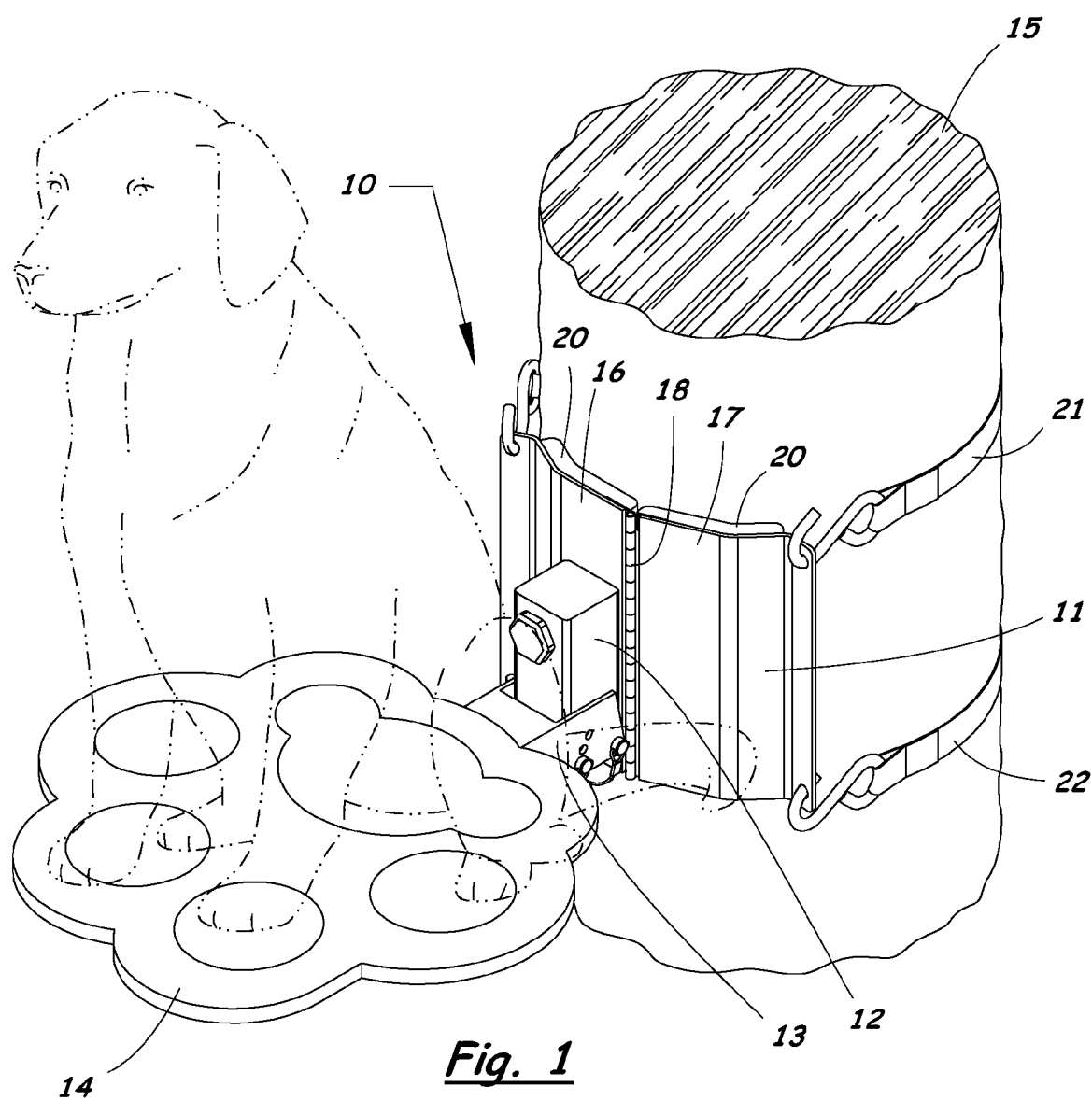
FIG. 1 is a perspective view of an adjustable platform assembly of the present invention attached to a tree.
Figure 2:
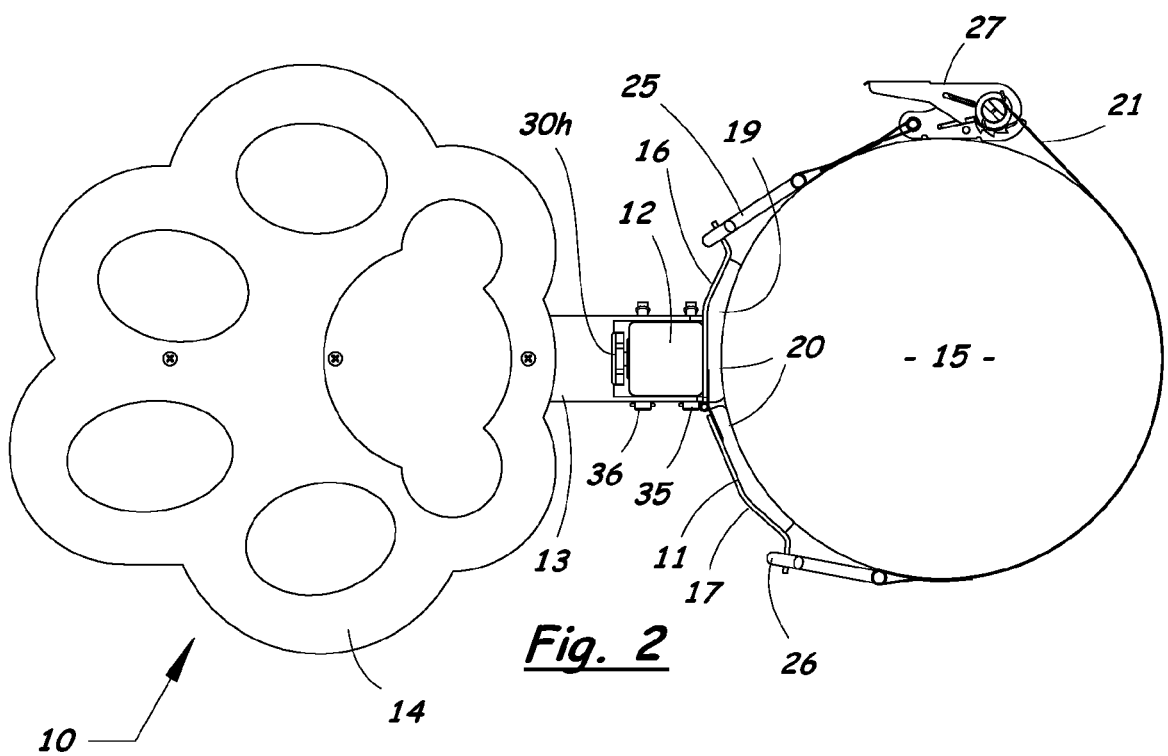
FIG. 2 is a top view of the adjustable platform assembly shown in FIG. 1.
Figure 3:
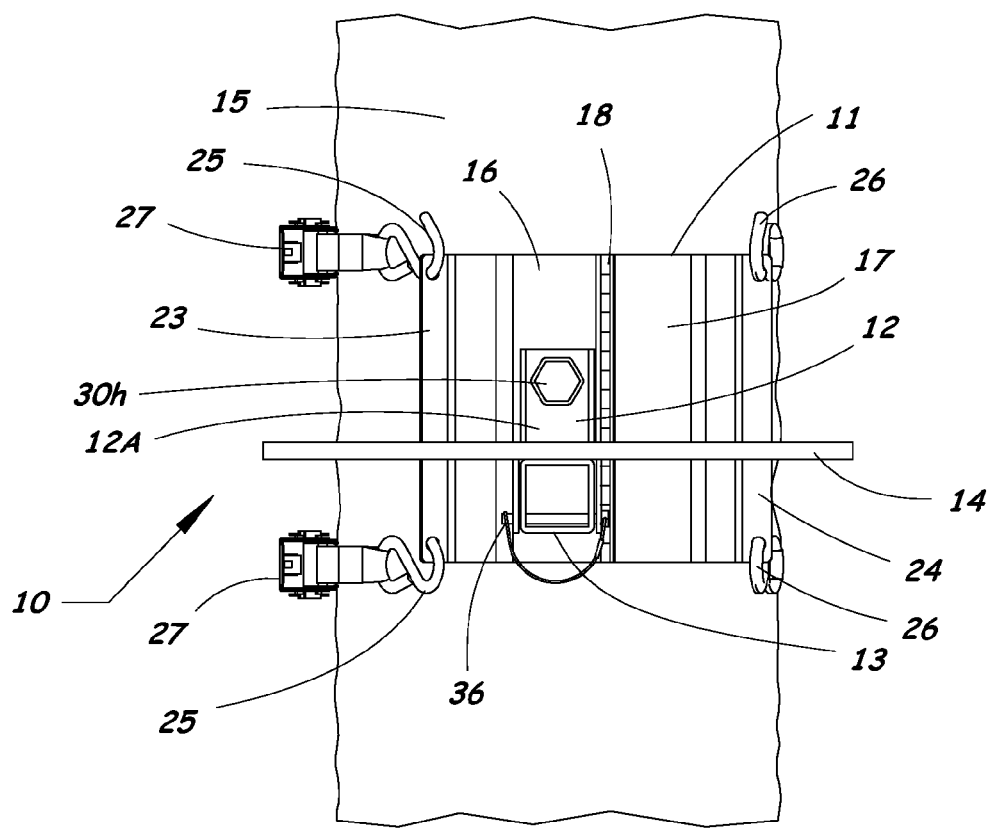
FIG. 3 is a front elevation view of the adjustable platform assembly shown in FIG. 1.

An adjustable platform assembly 10 according to the present invention will be described in detail with reference to FIGS. 1 to 9 of the accompanying drawings.

The adjustable platform assembly 10 comprises a tree hugging subassembly 11, a first frame member 12, a second frame member 13, and a platform 14. The tree hugging subassembly 11 is used to attach the adjustable platform assembly 10 to a tree 15. The first and second frame members 12, 13 are made to allow the angle of the platform 14 relative to the tree hugging subassembly 11 to be adjusted to accommodate tree trunks or tree branches that are non-vertical.

The tree hugging subassembly 11 has first and second tree engaging members 16, 17 connected together by a hinge 18. The tree engaging members 16, 17 can be made of a rigid plate material that is bent into an arcuate shape to accommodate a curvature of the tree 15. Each of the tree engaging members 16, 17 has a generally arcuate shaped surface 19 on a side facing the tree 15. The arcuate shaped surface 19 is covered by a padded material 20, such as neoprene, foam rubber or other suitable soft resilient material, for engaging the tree 15 to prevent damage to the tree.

First and second strap fasteners 21, 22 are connected to respective outer side edges 23, 24 of the tree engaging members 16, 17 for securing the tree engaging members 16, 17 to a tree. The strap fasteners 21, 22 each have a first hook 25 connected to the side edge 23 of the first tree engaging member 16, and a second hook 26 connected to the side edge 24 of the second tree engaging member 17. The strap fasteners 21, 22 each have a ratchet mechanism 27 for tightening the straps 21, 22 around the tree 15. The strap fasteners 21, 22 are spaced apart from each other to provide a secure coupling of the assembly 10 to the tree 15.

Figure 9:
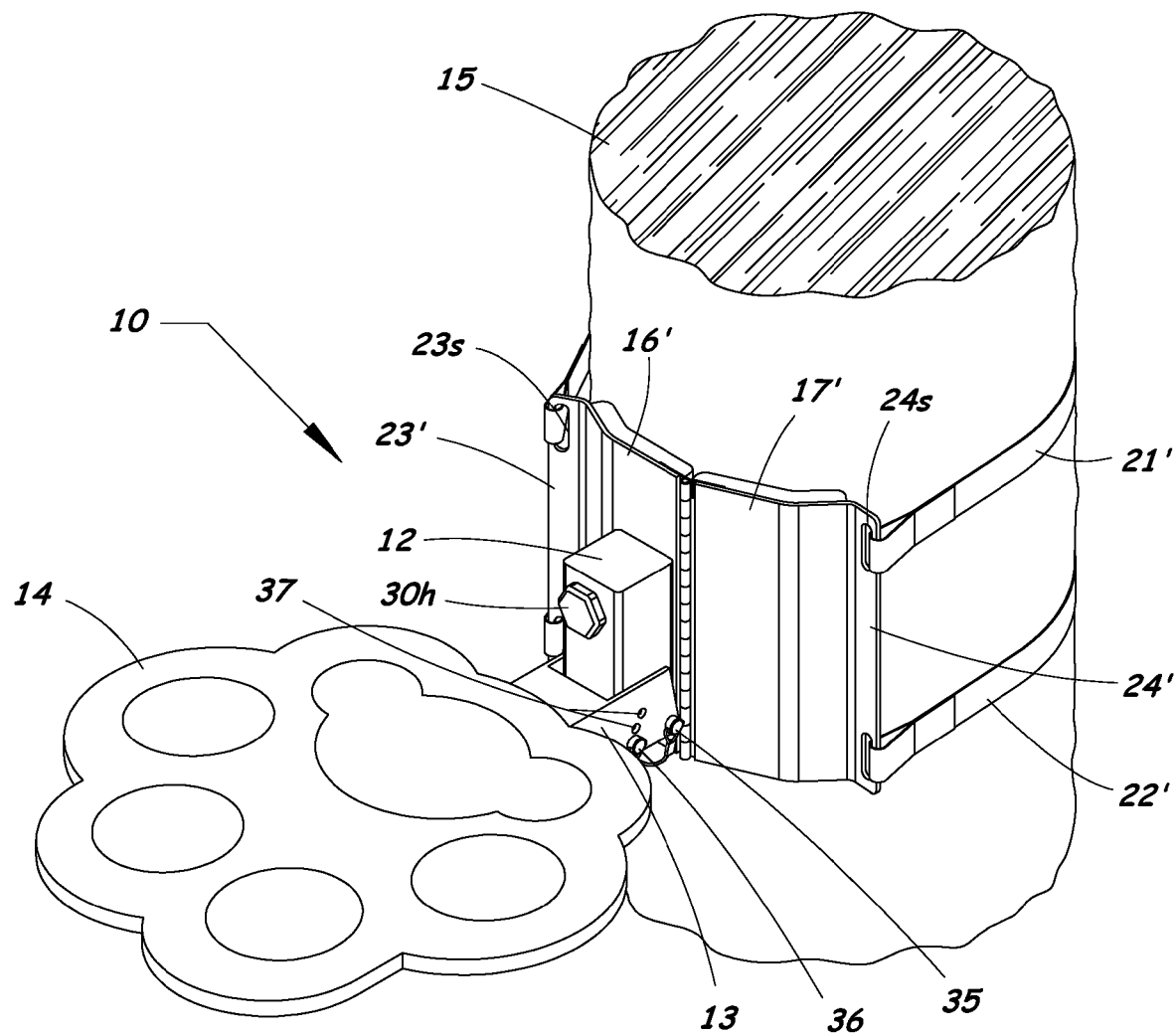
FIG. 9 is a perspective view of an adjustable platform assembly according to another embodiment in which the strap fasteners are permanently attached to the outer side edges of the tree engaging members.

In an alternative embodiment illustrated in FIG. 9, the strap fasteners 21', 22' are permanently secured to the side edges 23', 24' of the tree engaging members 16', 17' by looping the straps 21', 22' through slots 23s, 24s in the side edges 23', 24'. The ends of the straps 21', 22' can be overlapped and sewed to make the loops permanent.

The first frame member 12 comprises a section of square tubing having a first bore 28 adjacent one end and a pair of second bores adjacent the other end. The first frame member 12 is attached to the first tree engaging member 16 by a threaded member 30 that extends through the first bore 28 in the first frame member 12 into a threaded receiver 31 fixed on the first tree engaging member 16. A hand grip 30h is provided on one end of the member 30 to allow adjustments to be made without using a wrench.

The threaded receiver 31 has an outer surface 32 that mates with a corresponding surface 33 in the bore 28 of the first frame member 12 to lock the first frame member 12 against rotation about a first axis (i.e., the axis of the threaded member 30). The outer surface 32 of the threaded receiver 31 can be hexagon shaped, as illustrated, or it can be a splined surface or other multi-sided shape.

The first frame member 12 can be pivotally adjusted about the first axis 30 by loosening the threaded member 30 from the threaded receiver 31 until the outer surface 32 of the threaded receiver 31 uncouples with the corresponding surface 33 of the first frame member 12. With the first frame member 12 uncoupled from the outer surface 32 of the threaded receiver 31, the first frame member 12 can be rotated relative to the first tree engaging member 16 about the first axis 30, which extends generally perpendicular to a longitudinal axis of the tree 15. Once the desired angular position is found (see FIGS. 6 and 7), the first frame member 12 is again mated with the outer surface 32 of the threaded receiver 31 to lock the first frame member 12 against rotation, and the threaded member 30 is threaded into the threaded receiver 31 to secure the first frame member 12 together with the first tree engaging member 16.

A first plane 12A is defined by a face of the first frame member 12. The first axis 30 extends perpendicular to the first plane 12A. A second plane is defined by the planar section indicated by line 8-8 in FIG. 6. The second plane is perpendicular to the first plane 12A and contains the first axis 30.

The second frame member 13 comprises a section of square tubing having a pair of sidewall extensions or flanges 34 extending from one end with a plurality of bores for attaching to the first frame member 12. The second frame member 13 is attached to the first frame member 12 by a first pin 35 that extends through a first set of aligned bores in the first and second frame members 12, 13, and a second pin 36 that extends through a second set of aligned bores in the first and second frame members 12, 13.

Figure 4:
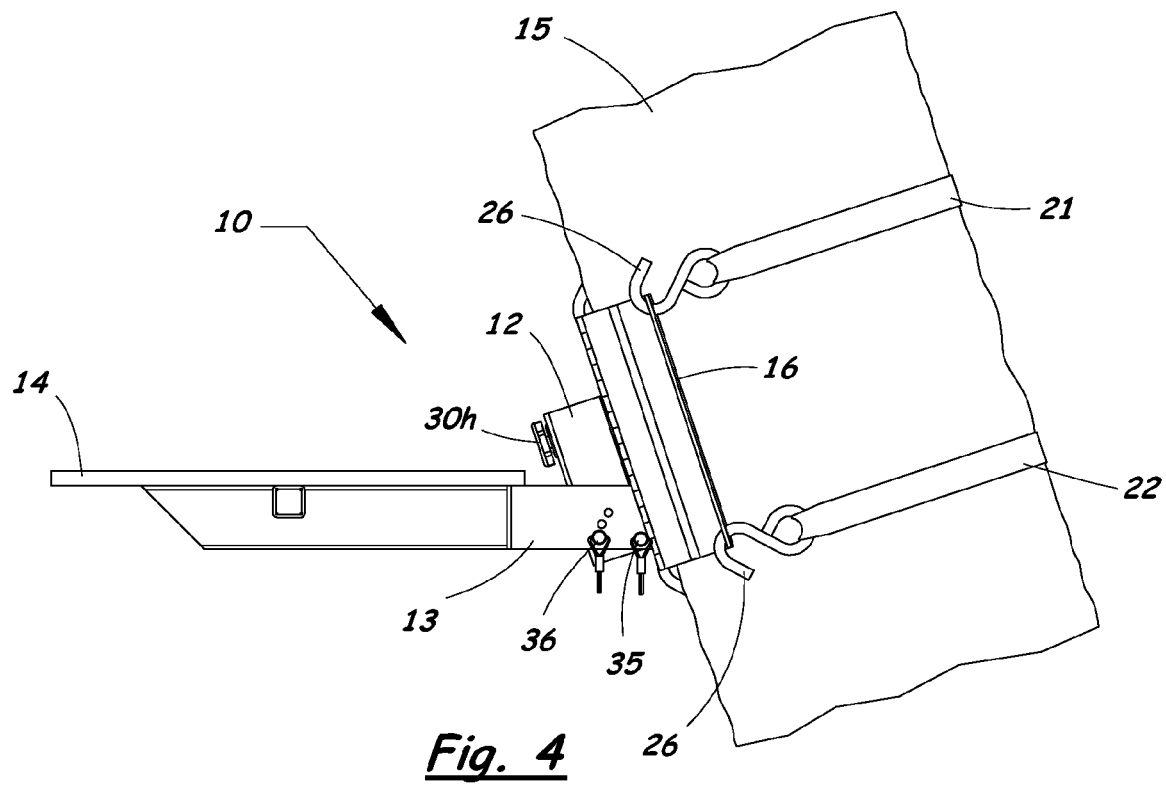
FIG. 4 is a side elevation view of the adjustable platform assembly in a first adjusted position to accommodate a leaning tree.
Figure 5:
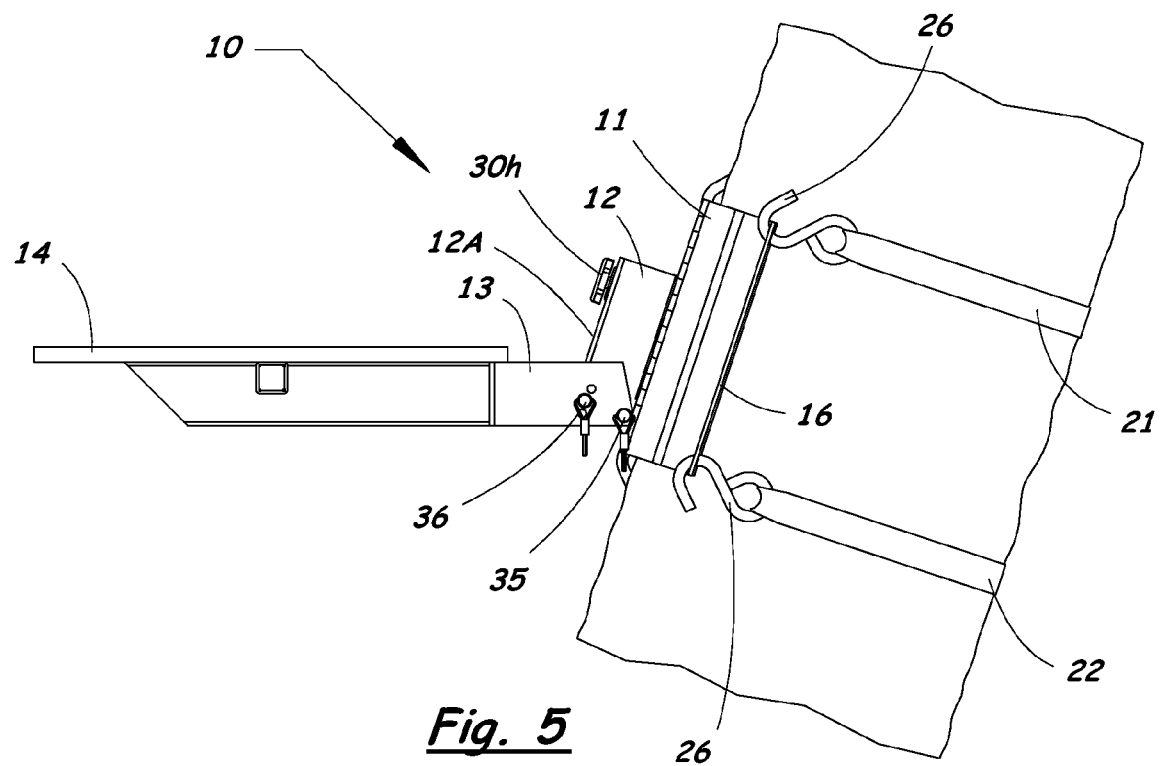
FIG. 5 is another side elevation view of the adjustable platform assembly in a second adjusted position to accommodate another leaning tree.

The second set of aligned bores includes a plurality of bores 37 in the second frame member 13 that can be selectively aligned with a bore in the first frame member 12 to provide a plurality of discrete adjusted positions of the second frame member 13 relative to the first frame member 12 (see FIGS. 4 and 5). The second frame member 13 is adjustable relative to the first frame member 12 about a second axis (i.e., the axis of the first pin 35), which extends generally perpendicular to the second plane defined by the line 8-8 in FIG. 6. The first and second axes 30, 35 are spaced apart from each other.

The platform 14 is attached to the second frame member 13 and can be adjusted to a generally horizontal position or other desired orientation by adjusting the first frame member 12 about the first axis 30 relative to the tree hugging subassembly 11, and by adjusting the second frame member 13 about the second axis 35 relative to the first frame member 12. The platform 14 can have a paw-shaped surface, as illustrated, or it can have a more conventional shape, such as a round or rectangular seat. The paw-shaped surface is particularly suited for use as a hunting dog perch, such as in wetlands for duck hunting, to provide a dry location for a hunting dog to sit.

While the invention has been specifically described in connection with specific embodiments thereof, it is to be understood that this is by way of illustration and not of limitation, and the scope of the appended claims should be construed as broadly as the prior art will permit.

What is claimed is:

1. An adjustable platform assembly for attaching to a tree, comprising:
   a tree hugging subassembly comprising a first tree engaging member and a second tree engaging member connected to said first tree engaging member by a hinge that allows free pivotal movement of said first and second tree engaging members relative to each other, said first and second tree engaging members each having a generally arcuate shaped surface on a side facing the tree to accommodate a curvature of the tree, said arcuate shaped surface being covered by a padded material for engaging the tree to prevent damage to the tree;
   a first strap fastener for securing said tree hugging subassembly to a tree, said first strap fastener has one end connected to a side edge of said first tree engaging member and another end connected to a side edge of said second tree engaging member;

a second strap fastener having one end connected to the side edge of said first tree engaging member and another end connected to the side edge of said second tree engaging member, said first and second strap fasteners being spaced apart from each other;

a first frame member attached to said tree hugging subassembly by attachment only to said first tree engaging member, said first frame member being pivotally adjustable relative to said first tree engaging member about a first axis that extends generally perpendicular to an axis of the tree and perpendicular to a first plane;

a second frame member attached to said first frame member, said second frame member being adjustable relative to said first frame member about a second axis that extends generally parallel to said first plane; and a platform attached to said second frame member, whereby said platform can be adjusted to a desired orientation by adjusting said first frame member relative to said first tree engaging member and by adjusting said second frame member relative to said first frame member, wherein said first frame member is attached to said first tree engaging member by a threaded member that extends through a bore in said first frame member into a threaded receiver on said first tree engaging member; and wherein said threaded receiver is fixed on said first tree engaging member, and said threaded receiver has an inner threaded surface that mates with said threaded member and a multi-sided outer surface that mates with a corresponding multi-sided inner surface in the bore of said first frame member to lock said first frame member against rotation about said first axis, whereby said multi-sided outer and inner surfaces can be mated in a plurality of positions or rotation of said first frame member relative to said first tree engaging member to provide indexed adjustment of the platform assembly about said first pivot axis.

2. The adjustable platform assembly according to claim 1, wherein said first axis is spaced apart from said second axis, and wherein said second axis is perpendicular to a second plane that extends perpendicular to said first plane and contains said first axis.

3. The adjustable platform assembly according to claim 1, wherein said multi-sided outer surface of said threaded receiver is a hexagon or splined surface.

4. The adjustable platform assembly according to claim 1, wherein said first frame member is attached to said second frame member by a first pin that extends through a first set of aligned bores in said first and second frame members, and a second pin that extends through a second set of aligned bores in said first and second frame members.

5. The adjustable platform assembly according to claim 4, wherein said second set of aligned bores comprises a plurality of bores in said second frame member that can be selectively aligned with a bore in said first plane member to provide a plurality of discrete adjusted positions of the second frame member relative to the first frame member.

6. The adjustable platform assembly according to claim 1, wherein said platform comprises a paw-shaped surface for providing a hunting dog perch.

\* \* \* \* \*